Aug. 14, 1951    I. D. KISTLER    2,564,069
MECHANISM FOR EXPANDING AND APPLYING
ELASTIC TIRES TO WHEELS
Filed Sept. 25, 1947    3 Sheets-Sheet 1
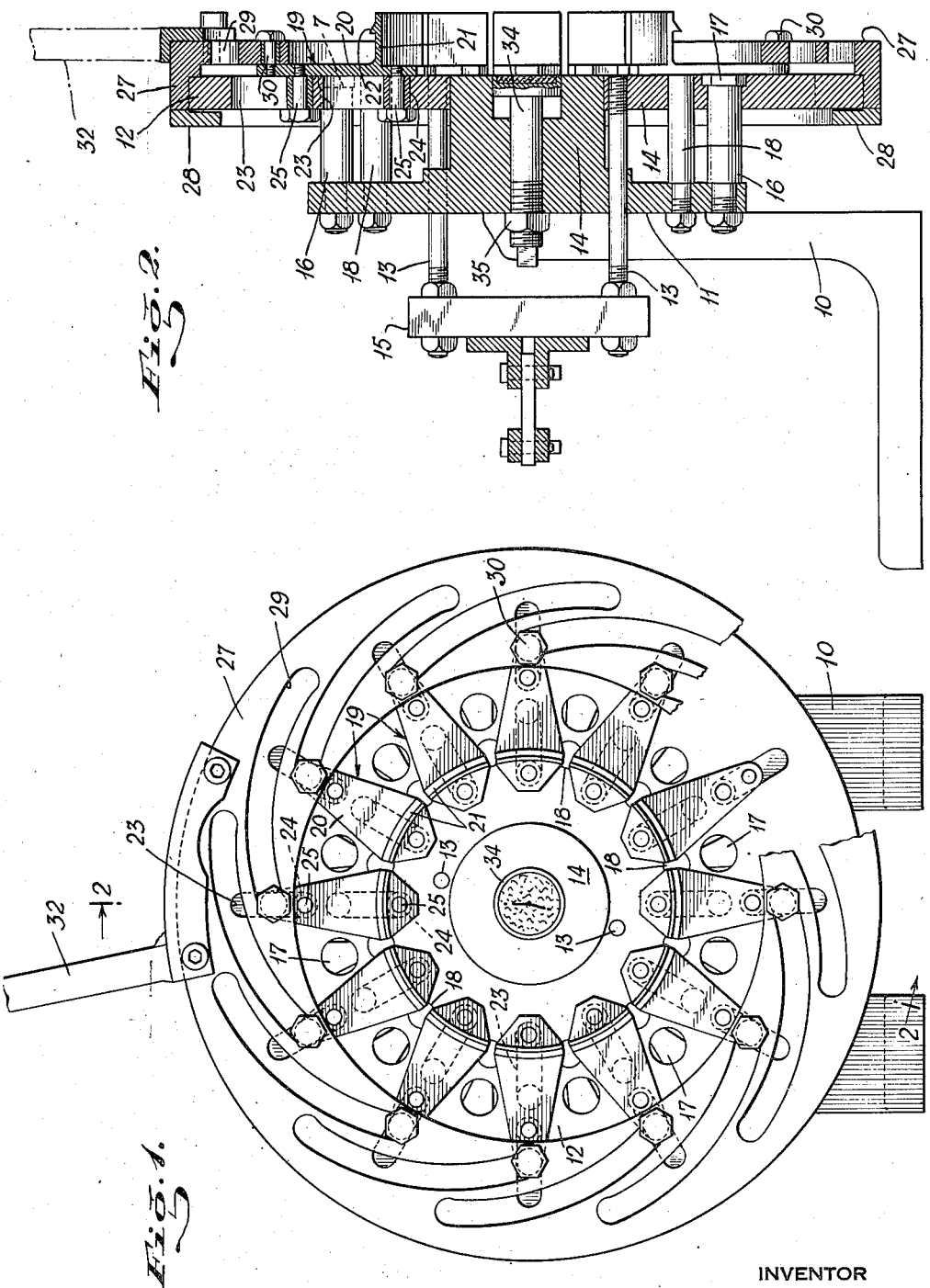
INVENTOR
IRWIN D. KISTLER
BY
ATTORNEY

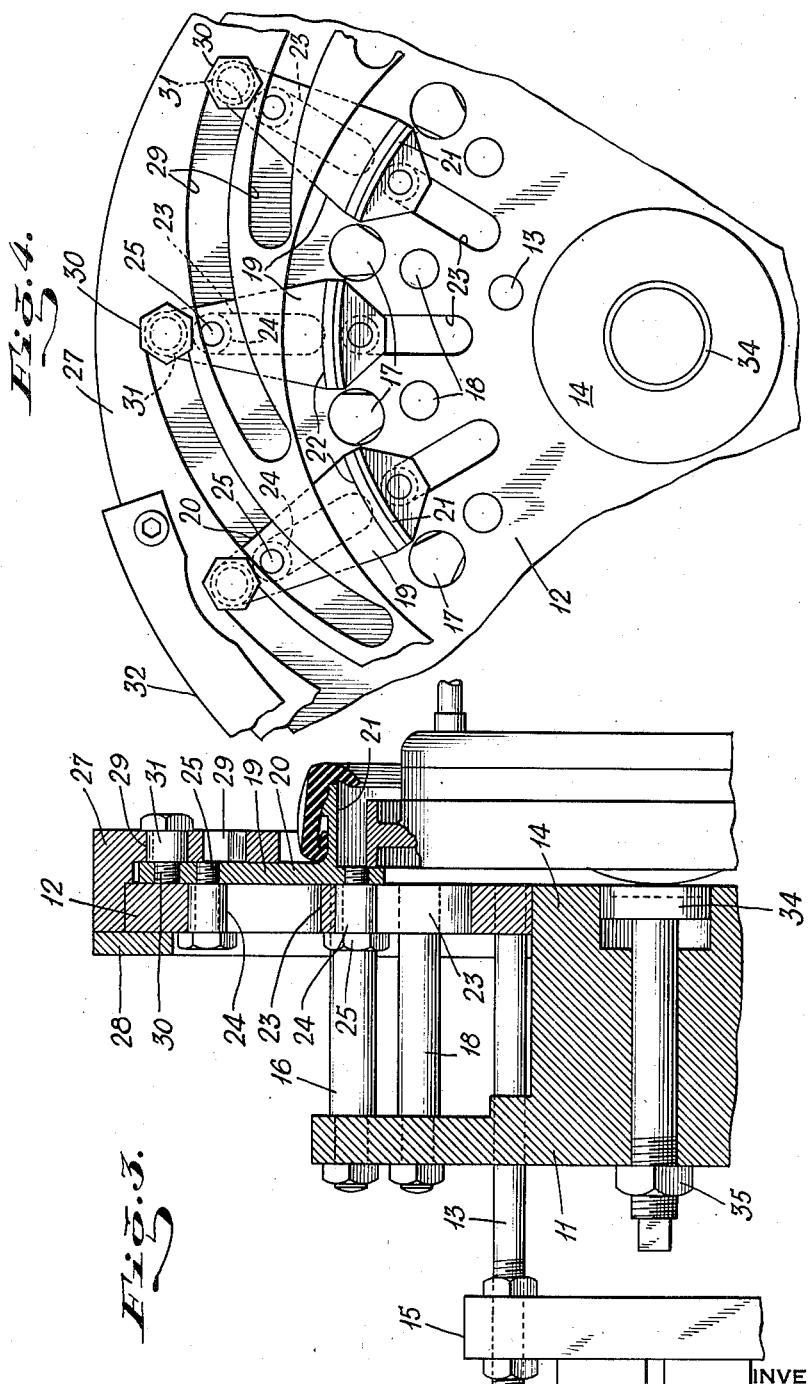

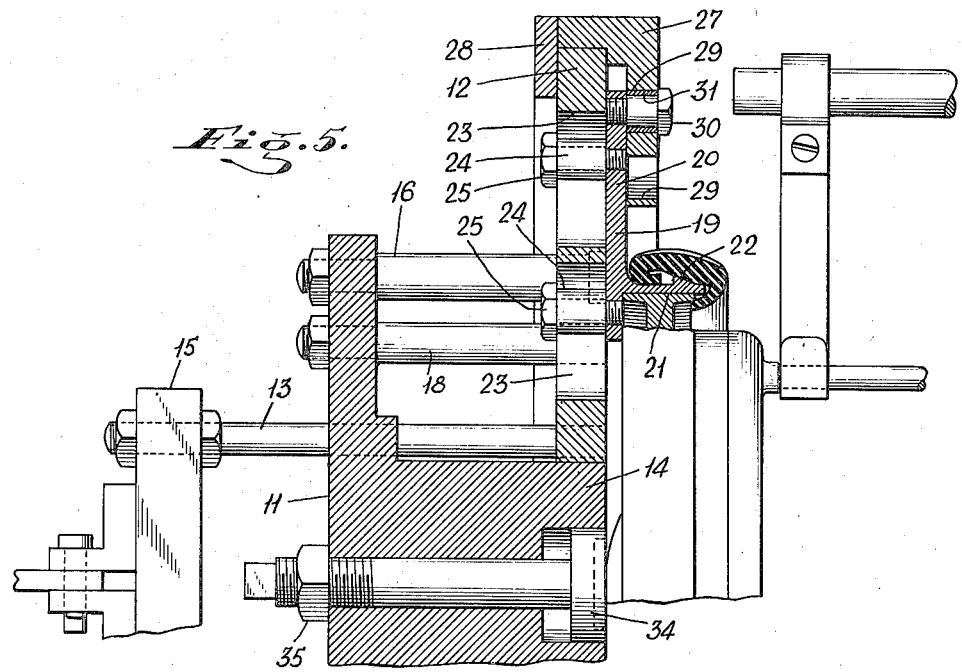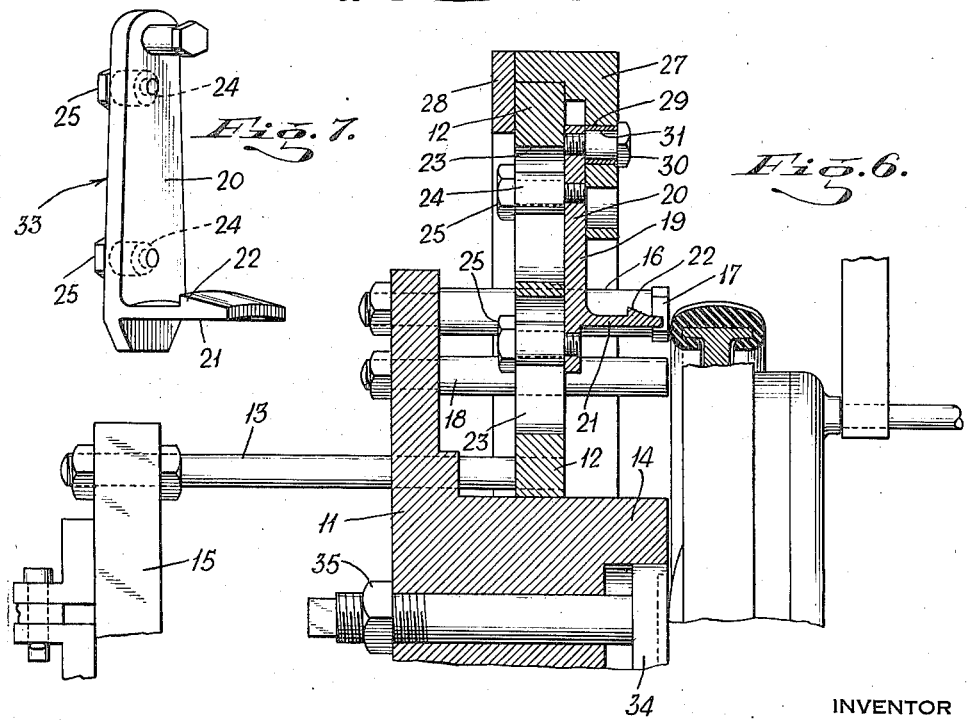

Patented Aug. 14, 1951

2,564,069

UNITED STATES PATENT OFFICE 2,564,069

MECHANISM FOR EXPANDING AND APPLYING ELASTIC TIRES TO WHEELS

Irwin D. Kistler, Philadelphia, Pa., assignor to American Chain & Cable Company, Inc., Bridgeport, Conn., a corporation of New York Application September 25, 1947, Serial No. 776,011

3 Claims. (Cl. 157—1.1)

This invention relates to machines for applying tires of the uninflated type.

The tires utilized in lawn movers, for example, are often merely rubber coverings for the treads and part of the sides of the wheel, with projecting bosses to assure sufficient traction. In order to make them as durable as possible, it is desirable to make them of a size and shape which will cause them to grip the wheel because of their elasticity. Also, as it is preferable that the tire be applied last in the manufacture, to preserve their new and neat appearance, vulcanization cannot be readily employed to attach the tires.

Accordingly, it becomes necessary to design the tires so that their mere shape, in relation to the shape of the wheel, will hold them firmly in place. However, so doing makes the tire difficult to apply. It is a primary object of this invention to provide a tire applying machine which will apply tires shaped to remain on the wheels by the tension of the rubber.

It is a further object of the present invention to provide a machine which can be adjusted to apply tires of considerably different diameters.

Referring now to the drawings:

Fig. 1 is an elevation of the mechanism as seen from the face on which tires are applied;

Fig. 2 is a section on line 2—2 of Fig. 1;

Fig. 3 is an enlarged fragmentary section similar to Fig. 2, with the parts in a different position and a tire and wheel in place;

Fig. 4 is a fragmentary elevation with the parts in the position of Fig. 3;

Fig. 5 is a fragmentary section showing the parts in position ready for the tire to be forced on to the wheel;

Fig. 6 is a fragmentary section at the completion of the tire applying cycle; and, Fig. 7 is a perspective view of a part to be substituted for utilizing a smaller tire on a smaller wheel.

The device shown consists essentially of a plurality of fingers arranged in a circle to receive the tire by engaging the inner surface of the tire, after which the fingers may be moved radially to expand the tire and permit the insertion of the wheel. Means is provided to then slip the tire off of the fingers onto the wheel.

A support 10 carries the mechanism, and is secured in place on a bench or other structure to bring the mechanism to a suitable height. Secured to this support 10 there is a hub 11, which in turn supports all of the rest of the mechanism. A plate 12, with two or more rods 13 secured to it, has a bore to receive the center boss 14 for sliding movement along the axis of the boss. The rods 13 pass through holes in the hub, and are secured to the bar 15. A suitable lever (not shown) may be provided to move bar 15 relative to the hub, to thus cause movement of the plate 12 axially of the hub.

A plurality of studs are secured to the hub 11 and pass through bores in the plate 12, and perform a guiding as well as another function as will later appear. The studs 16 are shown as having heads 17, which, when the plate 12 is farthest to the right, lie within counterbores in plate 12, so the top surface is substantially flush. The studs 18 are arranged in a circle of less diameter than the studs 16, and are not provided with heads.

Mounted on the plate 12 a plurality of finger pieces 19, which consist essentially of flat portions 20 engaging the face of plate 12, and upstanding portions 21, provided with the slight projections 22, for receiving the tire.

In order to permit movement of the fingers 19 radially, a plurality of radial slots 23 is cut in the plate 12. Within these slots are bushings 24 rotatably mounted on the headed studs 25, which are in turn threaded into the flat portions 20 of the finger pieces. The finger pieces are thus guided in motion in a radial direction and at the same time held to the plate 12.

The finger pieces are moved simultaneously by means of a cam plate 27, which comprises a flanged plate, with a ring 28 secured to it to hold it on the periphery of the plate 12. A number of spiral slots 29 are cut through the plate, and studs 30, carrying rollers 31, are secured to each of the finger pieces with the studs and rollers passing through the spiral slots. A lever 32 secured to the cam plate for rotating it relatively to the plate 12.

When it is desired to apply a tire of considerably smaller diameter than the capacity of the machine set up as shown, finger pieces 33 may be substituted for those shown. They are the same, functionally, as finger pieces 19 and the only real difference is that the projecting part engaging a tire is so located that it falls nearer the center of the assembly.

In order to position correctly a wheel while a tire is being applied, a stop member may be utilized. This member consists of a plug 34 within a bore in the hub 11, provided with a threaded stem, and adjustable in the bore. A nut 35 secures it in adjusted position. To prevent marring the hub of the wheel, a leather or other soft washer is inserted in a recess in the face of the stop.

The operation of the device is as follows. With the fingers in the position shown in Figs. 1 and 2, the tire is slipped over the fingers. The outer side wall overhangs the fingers, while the inner side wall is folded under the tread. The lever 32 is then moved, causing the fingers to move radially, and a wheel is brought into position against the stop member 34. This is shown in Fig. 3. The cam plate is rotated slightly to bring the side wall of the tire down around the wheel and the fingers near the rim or in contact with it, as in Fig. 5. The plate 12 is then drawn to the left, the stop member 34 preventing the wheel from following this motion, and the pins 17 preventing the tire from doing likewise. Consequently, the tire and wheel are held in the same relative position, and the fingers drawn out from under the tire. As a result, the tire is opened up or spread by the projections 22 on the fingers, and snaps into place around the wheel.

In the case of a tire of considerably smaller diameter, a finger piece like that shown in Fig. 7 is substituted for each of the finger pieces shown, and the machine operates exactly as before, except that the inner circle of pins 18 is utilized to engage the tire and force it off the fingers.

I claim:

1. A tire applying mechanism for elastic tires of the type having side walls embracing the sides of the rim of a wheel including a support having a circular array of parallel pins, a member mounted for sliding movement axially with respect to said pins, said pins projecting through said member, a plurality of fingers mounted in circular array on said member for radial movement and means for moving said fingers radially, said fingers forming a support for a tire and engageable with the inner periphery thereof, and said pins forming abutments engaging a side of the tire upon sliding movement of the member to force the tire off the fingers.

2. A tire applying mechanism for elastic tires of the type having side walls embracing the sides of the rim of a wheel including a support having a circular array of parallel pins, a member mounted for sliding movement axially with respect to said pins, said pins projecting through said member, a plurality of tire engaging fingers mounted in a circular array on said member for sliding radial movement, an annular plate mounted on said member having cam surfaces engaging projections on said fingers and causing radial movement of said fingers upon movement of said plate relative to said member to thereby stretch the tire, said pins upon relative movement between the member and the support abutting the side of a tire on said fingers and forcing it off the fingers.

3. A tire applying mechanism for elastic tires of the type having side walls embracing the sides of the rim of a wheel including a support having a cylindrical projection and a plurality of parallel pins mounted in circular array around the projection, a plate mounted for axial sliding movement along the projection, said plate having openings through which said pins pass during such sliding movement, said plate having a plurality of radial slots, a plurality of L-shaped finger pieces mounted for sliding movement guided and supported by said slots, said finger pieces presenting a circular array of tire supporting fingers, a ring mounted on said plate for rotation with respect thereto, said ring having a plurality of cam slots, said cam slots each engaging a projection on a finger piece whereby rotation of the ring causes radial sliding movement of the finger piece.

IRWIN D. KISTLER.

REFERENCES CITED

The following references are of record in the file of this patent:

UNITED STATES PATENTS

| Number | Name | Date |
| --- | --- | --- |
| 1,100,032 | Speck | June 16, 1914 |
| 1,490,895 | Gerstenlager | Apr. 15, 1924 |
| 1,578,760 | Replogle | Mar. 30, 1926 |
| 2,197,808 | Mason | Apr. 23, 1940 |
| 2,351,355 | Merrett | June 13, 1944 |

FOREIGN PATENTS

| Number | Country | Date |
| --- | --- | --- |
| 627,563 | Germany | Mar. 18, 1936 |